United States Patent
McMillen

(10) Patent No.: US 12,556,370 B2
(45) Date of Patent: Feb. 17, 2026

(54) SYSTEMS AND METHODS OF CLOUD-BASED MULTIFACTOR AUTHENTICATION

(71) Applicant: McMillen Holdings, Inc, Modesto, CA (US)

(72) Inventor: Ryan McMillen, Modesto, CA (US)

(73) Assignee: McMillen Holdings, Inc, Modesto, CA (US)

(*) Notice: Subject to any disclaimer, the term of this patent is extended or adjusted under 35 U.S.C. 154(b) by 183 days.

(21) Appl. No.: 18/581,850

(22) Filed: Feb. 20, 2024

(65) Prior Publication Data
US 2025/0266985 A1 Aug. 21, 2025

(51) Int. Cl.
H04L 29/06 (2006.01)
H04L 9/06 (2006.01)
H04L 9/08 (2006.01)

(52) U.S. Cl.
CPC .......... H04L 9/0656 (2013.01); H04L 9/0863 (2013.01); H04L 9/0866 (2013.01)

(58) Field of Classification Search
None
See application file for complete search history.

(56) References Cited

U.S. PATENT DOCUMENTS

| | | | | |
|---|---|---|---|---|
| 11,570,180 | B1* | 1/2023 | Fitzpatrick | H04L 9/0643 |
| 12,267,431 | B2* | 4/2025 | Sutherland | H04L 9/0894 |
| 2016/0171492 | A1* | 6/2016 | Carrott | G06Q 20/40 705/71 |
| 2019/0043045 | A1* | 2/2019 | Wilson | G06Q 20/3821 |
| 2019/0222424 | A1* | 7/2019 | Lindemann | H04L 9/3231 |
| 2019/0295074 | A1* | 9/2019 | Carrott | H04L 63/0838 |
| 2019/0306156 | A1* | 10/2019 | Agarwal | H04L 9/088 |
| 2022/0078005 | A1* | 3/2022 | Lanc | H04L 9/0866 |

(Continued)

OTHER PUBLICATIONS

Konwar, Rajashree et al. A Two-Factor Authentication Mechanism Using a Novel OTP Generation Algorithm for Cloud Applications. 2024 14th International Conference on Cloud Computing, Data Science & Engineering (Confluence). https://ieeexplore.ieee.org/stamp/stamp.jsp?tp=&arnumber=10463309 (Year: 2024).*

(Continued)

*Primary Examiner* — Jeremiah L Avery
(74) *Attorney, Agent, or Firm* — Kilpatrick Townsend & Stockton LLP

(57) ABSTRACT

A method may include receiving, by a multifactor authentication (MFA) service instantiated on a computing system, a token generated by a cloud services provider and associated with a user device. The MFA service may be instantiated within a tenancy of the cloud services provider. The method may include determining, by the computing system, an authorized cloud service instantiated within the tenancy. The method may include receiving, by the computing system, a request to access the authorized cloud service by the user device, where the request may include a multi-factor authentication request. The method may include generating, by the MFA service instantiated on the computing system, a one-time pad (OTP). The method may include providing, by the MFA service instantiated on the computing system, the OTP to the user device such that the user device accesses the authorized cloud service.

20 Claims, 7 Drawing Sheets

(56) References Cited

U.S. PATENT DOCUMENTS

| | | | | |
|---|---|---|---|---|
| 2023/0208644 | A1* | 6/2023 | Fitzpatrick | G06F 21/31 |
| | | | | 713/155 |
| 2025/0124438 | A1* | 4/2025 | Lindemann | G06F 21/316 |
| 2025/0266985 | A1* | 8/2025 | McMillen | H04L 9/0863 |
| 2025/0300963 | A1* | 9/2025 | Sutherland | H04L 63/0236 |

OTHER PUBLICATIONS

Hassan, Md Arif; Shukur, Zarina. A Secure Multi Factor User Authentication Framework for Electronic Payment System. 2021 3rd International Cyber Resilience Conference (CRC). https://ieeexplore.ieee.org/stamp/stamp.jsp?tp=&arnumber=9392564 (Year: 2021).*

Soares, Liliana F.B. et al. Secure user authentication in cloud computing management interfaces. 2013 IEEE 32nd International Performance Computing and Communications Conference (IPCCC). https://ieeexplore.ieee.org/stamp/stamp.jsp?tp=&arnumber=6742763 (Year: 2013).*

Ahmed, Abdulghani Ali et al. Dynamic Reciprocal Authentication Protocol for Mobile Cloud Computing. IEEE Systems Journal, vol. 15, Issue: 1. https://ieeexplore.ieee.org/stamp/stamp.jsp?tp=&arnumber=9180352 (Year: 2021).*

* cited by examiner

SYSTEMS AND METHODS OF CLOUD-BASED MULTIFACTOR AUTHENTICATION

BACKGROUND

Access to various resources may be granted in response to one or more authentication protocols, include multifactor authentication (MFA). MFA may be achieved using a one-time pad (OTP). However, in larger systems, the number of people and devices needed to implement MFA for each person and device may be inefficient to use and manage, leading to poor security practice such as sharing OTPs.

BRIEF SUMMARY

A method may include receiving, by a multifactor authentication (MFA) service instantiated on a computing system, a token generated by a cloud services provider and associated with a user device. The MFA service may be instantiated within a tenancy of the cloud services provider. The method may include determining, by the computing system, an authorized cloud service instantiated within the tenancy. The method may include receiving, by the computing system, a request to access the authorized cloud service by the user device, where the request may include a multi-factor authentication request. The method may include generating, by the MFA service instantiated on the computing system, a one-time pad (OTP). The method may include providing, by the MFA service instantiated on the computing system, the OTP to the user device such that the user device accesses the authorized cloud service.

In some embodiments, the request to access the authorized cloud service includes a set of credentials used to validate the user device with the MFA service. The OTP may include a temporary access pass (TAP). The OTP may include a time-based one-time password. In some embodiments, generating, by the MFA service instantiated on the computing system, the OTP may also include accessing, by the MFA service instantiated on the computing system, a database may include a key associated with the authorized cloud service. The method may then include generating, by the MFA service instantiated on the computing system, the OTP utilizing a hash with the key associated with the authorized cloud service. The database may be a multitenant database including a plurality of keys associated with respective cloud services. The OTP may be provided to the user device via a browser plugin.

A system may include one or more processors and a non-transitory computer memory, including instructions that, when executed by the one or more processors, cause the system to perform operations. According to the operations, the system may receive, by an MFA service instantiated on a computing system, a token generated by a cloud services provider and associated with a user device, the MFA service instantiated within a tenancy of the cloud services provider. The system may determine, by the computing system, an authorized cloud service instantiated within the tenancy. The system may receive, by the computing system, a request to access the authorized cloud service by the user device, where the request may include a multi-factor authentication request. The system may generate, by the MFA service instantiated on the computing system, a one-time pad (OTP). The system may provide, by the MFA service instantiated on the computing system, the OTP to the user device such that the user device accesses the authorized cloud service.

In some embodiments, the request to access the authorized cloud service may include a set of credentials used to validate the user device with the MFA service. The OTP may include a temporary access pass (TAP). The OTP may include a time-based one-time password. In some embodiments, to generate, by the MFA service instantiated on the computing system, the OTP, the system may access, by the MFA service instantiated on the computing system, a database may including a key associated with the authorized cloud service. The system may generate, by the MFA service instantiated on the computing system, the OTP utilizing a hash and the key associated with the authorized cloud service. The database may be a multitenant database including a plurality of keys associated with respective cloud services. The OTP may be provided to the user device via a browser plugin.

A non-transitory computer-readable medium may include instructions that cause one or more processors to perform operations including receiving, by an MFA service instantiated on a computing system, a token generated by a cloud services provider and associated with a user device, the MFA service instantiated within a tenancy of the cloud services provider. The operations may include determining, by the computing system, an authorized cloud service instantiated within the tenancy. The operations may include receiving, by the computing system, a request to access the authorized cloud service by the user device, where the request may include a multi-factor authentication request. The operations may include generating, by the MFA service instantiated on the computing system, a one-time pad (OTP). The operations may include providing, by the MFA service instantiated on the computing system, the OTP to the user device such that the user device accesses the authorized cloud service.

In some embodiments, the request to access the authorized cloud service may include a set of credentials used to validate the user device with the MFA service. The OTP may include a temporary access pass (TAP). The OTP may include a time-based one-time password. In some embodiments, generating, by the MFA service instantiated on the computing system, the OTP may further include accessing, by the MFA service instantiated on the computing system, a database including a key associated with the authorized cloud service. The operations may include generating, by the MFA service instantiated on the computing system, the OTP utilizing a hash and the key associated with the authorized cloud service. The database may be a multitenant database including a plurality of keys associated with respective cloud services.

DETAILED DESCRIPTION

Figure 1A:
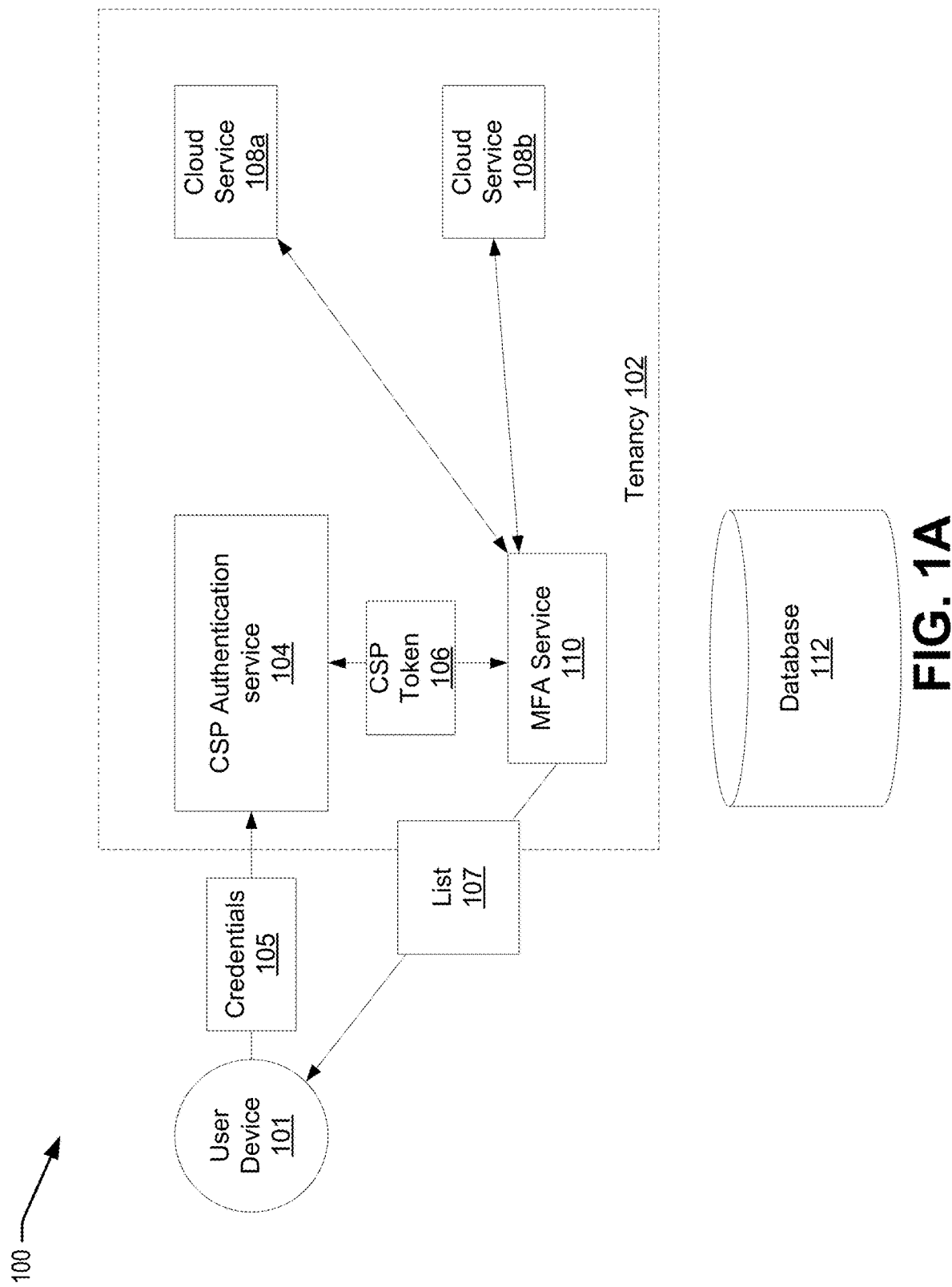
FIGS. 1A-1D illustrate a simplified diagram of a system for providing cloud-based multifactor authentication, according to certain embodiments.

With the rise in prevalence of cloud computing, users have been able to access the resources and services needed to perform tasks from virtually anywhere. To access the resources, users (from user devices) may need to authenticate to a tenancy of a cloud service provider, where the resources (e.g., a cloud-based service) is hosted. Generally, the authentication may be performed by the cloud service provider using credentials (e.g., a username and password) associated with the user. However, solely relying on a username and password to access cloud resources may present security risks through poor password hygiene, brute force attacks, phishing schemes, and other vulnerabilities. To address some of these concerns, an organization may implement a multi-factor authentication (MFA) protocol, providing an additional layer of security and authentication.

Typically, an MFA protocol utilizes a one-time pad (OTP), unique to a user device in order to verify (or re-authenticate) the user device after the initial authentication. A computing system (or service running thereon) may be associated a secret key, used to generate the OTP upon request. To generate the OTP, the secret key may be provided to the user device. Then, in some embodiments, the user device may use a seed value (associated with a counting module) and a cryptographic hash to generate the OTP. The OTP is then decrypted using the secret key by the user device, and the OTP is used to authenticate to the session. In other embodiments, the OTP may be time based, where a clock of the user device is used to generate the OTP using the cryptographic hash. A clock on the computing system is also used to generate the OTP using the same cryptographic hash. The user device may then decrypt the OTP and transmit the OTP to the computing system for verification. Other methods of OTP generation may also be possible.

One commonality between the above methods of MFA protocols is the reliance on the user device to generate the OTP. This means, however, that each user must be associated with a user device, and each user device must include the secret key. In large organizations, this may increase the risk potential exposure of the secret key simply by the number of devices holding the secret key. Furthermore, once the secret key is provided to a particular user device, the secret key may be stored on the particular user device indefinitely. This means that if the user associated with the user device loses (or should lose) access to the resources associated with the MFA protocol, the user device may still have the secret key stored and may potentially access unauthorized resources.

Furthermore, many organizations may enlist the help of third parties to help maintain and administer their cloud resources (or other resources). These third parties may have multiple users that are required to authenticate to the organizations resources in order to perform their services. Multiple users of the third parties may each have the secret key stored on an associated user device, adding to the issues outlined above. Alternatively, the third party may share credentials (e.g., a service account). Individual users may then share OTPs in order to authenticate to the resources, risking further exposure of the secret key and/or the organization's resources. Thus, there is a need to provide multi-factor authentication that is secure and not necessarily tied to a specific user device in order to securely provide access to resources and/or services.

One solution may be to provide a cloud based MFA service in order to provide access to resources such as cloud-based services. A user device may authenticate with a cloud services provider using a set of credentials (e.g., a username and password). Once the user is authenticated with the cloud services provider, the user device may access a tenancy administered by the cloud services provider and associated with an organization. An instance of an MFA service, running within the tenancy, may then receive a token from the cloud services provider. The token indicating certain information about the user device (and/or a user thereof). The MFA service may then determine one or more services (or other resources) running within the tenancy that the user device is authorized to access, and transmit data to the user device indicating the authorized services.

The user device may then transmit a request to access an authorized service to the MFA service. The request may include a request for MFA (e.g., a request for an OTP or other single use token). The MFA service may then access a database including a secret key associated with the authorized service, and use the secret key to generate an OTP. The MFA service may then provide the OTP to the user device. Using the OTP, the user device may then access the authorized service. Because the OTP is generated by an instance of the MFA service running within the tenancy, and not on the user device, the user device does not receive the secret key ever, and the organization associated with the tenancy retains control over the secret key.

FIG. 1A illustrates a simplified diagram of a system 100 for providing cloud-based multifactor authentication, according to certain embodiments. The system 100 may include a user device 101, and a tenancy 102. The user device 101 may be a computer, laptop, mobile phone, tablet, or any other suitable computing device. The user device 101 may be associated with a specific user or may be associated with no particular user.

The tenancy 102 may be one or more physical or virtual machines that are part of a cloud computing system provided by a cloud services provider (CSP). The tenancy 102 may be associated with a client of the CSP. The tenancy 102 may include a CSP authentication service 104, cloud services 108a-b, and an MFA service 110. The CSP authentication service 104 may be instantiated within the tenancy 102, or may be separate from the tenancy 102. The CSP authentication service 104 may be administered by the CSP and configured to authenticate a user (and/or a user device) to the CSP and/or the tenancy 102. The CSP authentication service 104 may access one or more databases or other data stores outside of the tenancy 102 in order to verify the user device 101. In some embodiments, the user device 101 may have credentials user to grant access to multiple tenancies. Then, the CSP authentication service 104 may access each of the multiple tenancies in order to provide access to the user device 101 to each of the multiple tenancies.

The MFA service 110 may be an instantiation of a service generally available to multiple tenants, including the tenant associated with the tenancy 102. The particular instantiation of the MFA service 110 may be administered in whole or in part by the tenant, and therefore only have access to the resources (e.g., the cloud services 108a-b) within the tenancy 102. The MFA service 110 may be further associated with a database 112. The database 112 may be include one or more secret keys user to generated OTPs for various cloud services (e.g., the cloud services 108a-b). For example, multiple instances of the MFA service 110 may be implemented within various tenancies of multiple tenants (e.g., customers of the CSP). The database 112 may therefore be a central repository for secret keys associated with multiple tenants. The database 112 may therefore be a multitenant database. To manage the secret keys of the multiple tenants, the database 112 may utilize one or more physical or logical divisions in order to only grant access to the secret keys to the proper tenant. One of ordinary skill in the art would recognize many different possibilities and configurations.

In some embodiments, each of the cloud services 108a-b may generate a respective secret key. Each of the cloud services 108 a-b may then transmit the respective secret keys to the database 112. In other embodiments, the MFA service 110 may generate the respective secret keys when instantiated within the tenancy 102, in response to a user input, when a new cloud service or other resource is made available within the tenancy 102, etc. The MFA service 110 may cause the respective secret keys to be re-generated according to a predetermined schedule (e.g., every day, every 1 week, every 2 weeks etc.). After the respective secret keys are generated, the MFA service 110 may transmit the respective secret keys to the appropriate cloud service 108a-b and/or the database 112. The MFA service 110 may further cause the appropriate cloud services 108a-b to be configured to generate and/or verify an OTP based on the respective secret key. When the cloud services 108a and/or 108b receive an OTP based on the respective secret key, the cloud services 108a and/or 108b may therefore utilize the respective secret key to verify the OTP and grant access.

The user device 101 may transmit credentials 105 to the CSP authentication service 104. The credentials 105 may include a username and password and/or other data needed to authenticate to the CSP. The credentials 105 may additionally include a secondary authentication scheme, such as an MFA scheme. The secondary authentication may be implemented within the tenancy 102 and/or within a different physical or virtual machine administered by the CSP.

The CSP authentication service 104 may utilize the credentials 105 to verify the identity of the user device 101 (or user thereof) and, based on the verification, grant the user device 101 access to the tenancy 102. Upon verification of the user device 101, the CSP authentication service 104 may generate a CSP token 106. The CSP token 106 may include information such as an identifier associated with the user device 101 (and/or a user thereof). The CSP token 106 may also include information that identifies an access level associated with the user. For example, a first user may be associated with a first access level. The first access level may permit the first user to access all of the resources within the tenancy 102 (e.g., the cloud services 108a-b). A second user may be associated with a second access level. The second access level may permit the second user to access only the cloud service 108b. One of ordinary skill in the art would recognize many different possibilities and configurations.

The CSP authentication service 104 may provide the CSP token 106 to the MFA service 110. The MFA service 110 may utilize some or all of the information included with the CSP token 106 to determine the access level of the user device 101. In some embodiments, the MFA service 110 may determine the access level of the user device solely based on the information of the CSP token 106. In other embodiments, the MFA service 110 may verify the access level of the user device 101 with each of the cloud service 108a-b (and/or any other resources of the tenancy 102). For example, the MFA service 110 may access each of the cloud services 108a-b and/or some other datastore to determine if the user device should be granted access to one or more of the cloud services 108a-b (e.g., utilizing the identifier included in the CSP token 106).

In any case, after verifying the access level of the user device 101, the MFA service 110 may provide a list 107 of allowed cloud services to the user device 101. The MFA service 110 may provide the list 107 to the user device 101 via an application programming interface (API), web connection, or other appropriate means. For example, the user device 101 may access the tenancy 102 via a web browser. The web browser may include a plugin that communicates with the MFA service 110 via an API. Upon verifying the access level of the user device 101, the MFA service 110 may utilize the API to transmit the list 107 to the web browser on the user device 101 via the plugin. The plugin may then cause the list 107 to be displayed within the web browser of the user device 101. The list 107 may be displayed as a list, buttons or tiles of a user interface, or other appropriate display. The list 107 may only include the services and/or resources allowed to be accessed by the user device per the access level. For example, the user device 101 may only be permitted to access the cloud service 108b. Then, only the cloud service 108b may be displayed in the web browser of the user device 101.

Figure 1B:
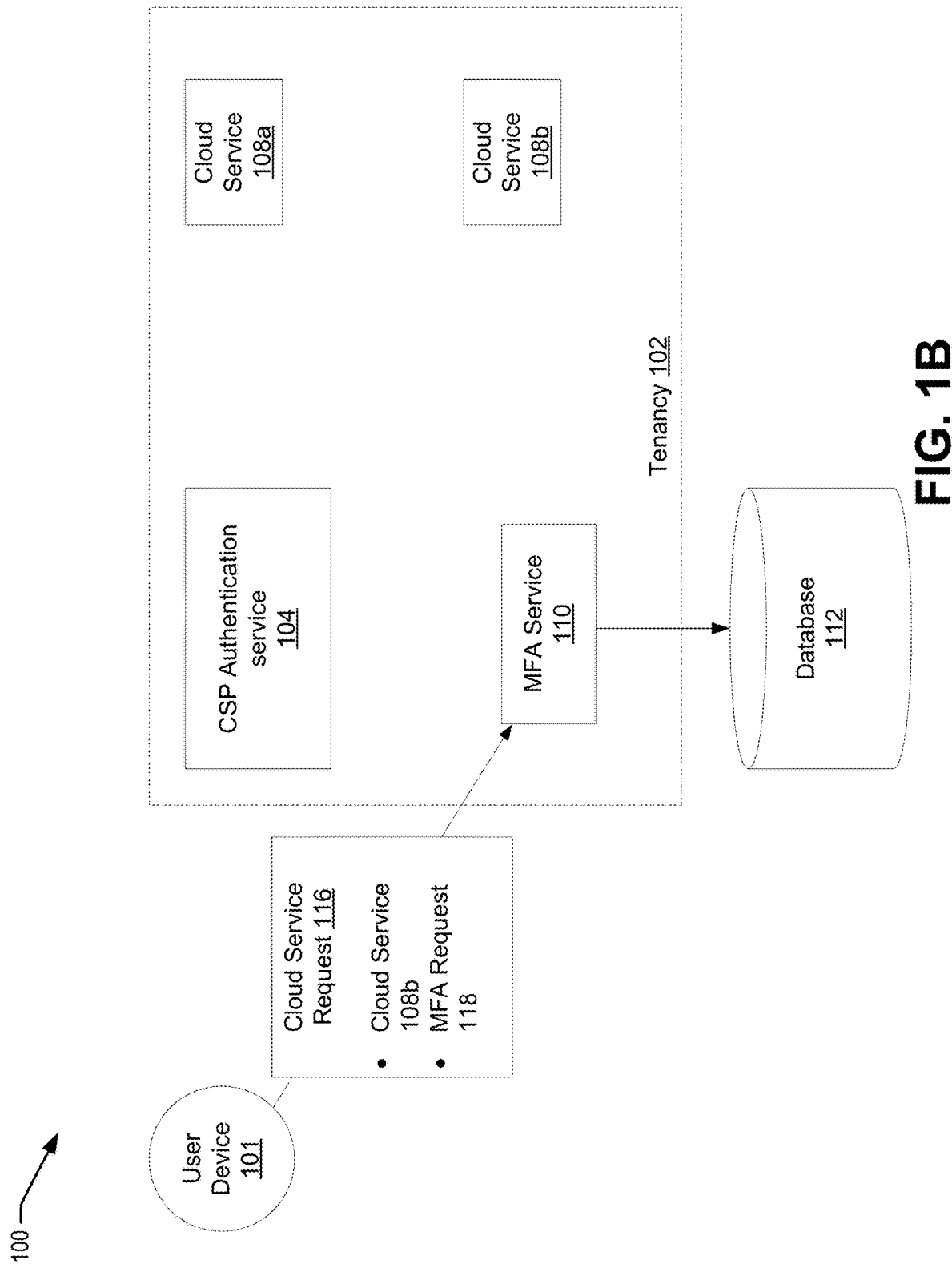

FIG. 1B illustrates a simplified diagram of the system 100 for providing cloud-based multifactor authentication, according to certain embodiments. The user device 101 may transmit a cloud service request 116 to the MFA service 110. The cloud service request 116 may be generated in response to a user input. For example, the web browser of the user device 101 may display a button corresponding to the cloud service 108b (as an allowed cloud service included in the list 107). A user may select the button and the user device may generate the cloud service request 116. The cloud service request 116 may include data that identifies a requested cloud service (here, the cloud service 108b). The cloud service request 116 may also include an MFA request 118. For example, the cloud service 108b may require multifactor authentication. When the user device requests access to the cloud service 108b, the cloud service request 116 may automatically include the MFA request 118 for the cloud service 108b. In other embodiments, the cloud service request 116 may not include the MFA request 118. In response to receiving the cloud service request 116, the MFA service 110 may determine that the cloud service 108b requires an OTP to access the cloud service 108b. The MFA service 110 may then generate the MFA request 118 independently.

In some embodiments, the MFA service 110 may receive the MFA request 118 included in the cloud service request 116 and determine further verification is needed. The MFA service 110 may then transmit a challenge (or other such prompt) to the user device 101. The challenge may prompt the user device 101 to provide credentials in order to process the MFA request 118. The user device 101 may then provide other credentials in response to the challenge. The other credentials may be the credentials 105, or may be other credentials associated with the MFA service 110 and/or the user device 101 (and/or a user thereof). For example, the other credentials may be an identifier associated with the user device 101 (e.g., a MAC address, an IMEI number, or other such identifier) and/or a username and password. One of ordinary skill in the art would recognize many different possibilities and configurations.

In response to receiving the cloud service request 116 and/or the MFA request 118, the MFA service 110 may access the database 112. The MFA service 110 may access a secret key associated with the cloud service 108b and/or the tenancy 102. The MFA service 110 may utilize some or all of the information included in the cloud service request 116 to determine the appropriate respective key within the data base 112. In some embodiments, the MFA service 110 may authenticate to the database 112 using data indicating the tenancy 102, the user device 101, and/or the cloud service 108b. In other words, the MFA service 110 may verify to the database 112 that the request to access the cloud service 108b is received from a valid requestor. Because the database 112 may be a multitenant database, storing the secret keys of multiple tenants and respective cloud resources thereof, this additional verification may reduce accidental or intentional access to the secret keys of tenants other than that associated with the tenancy 102.

Figure 1C:
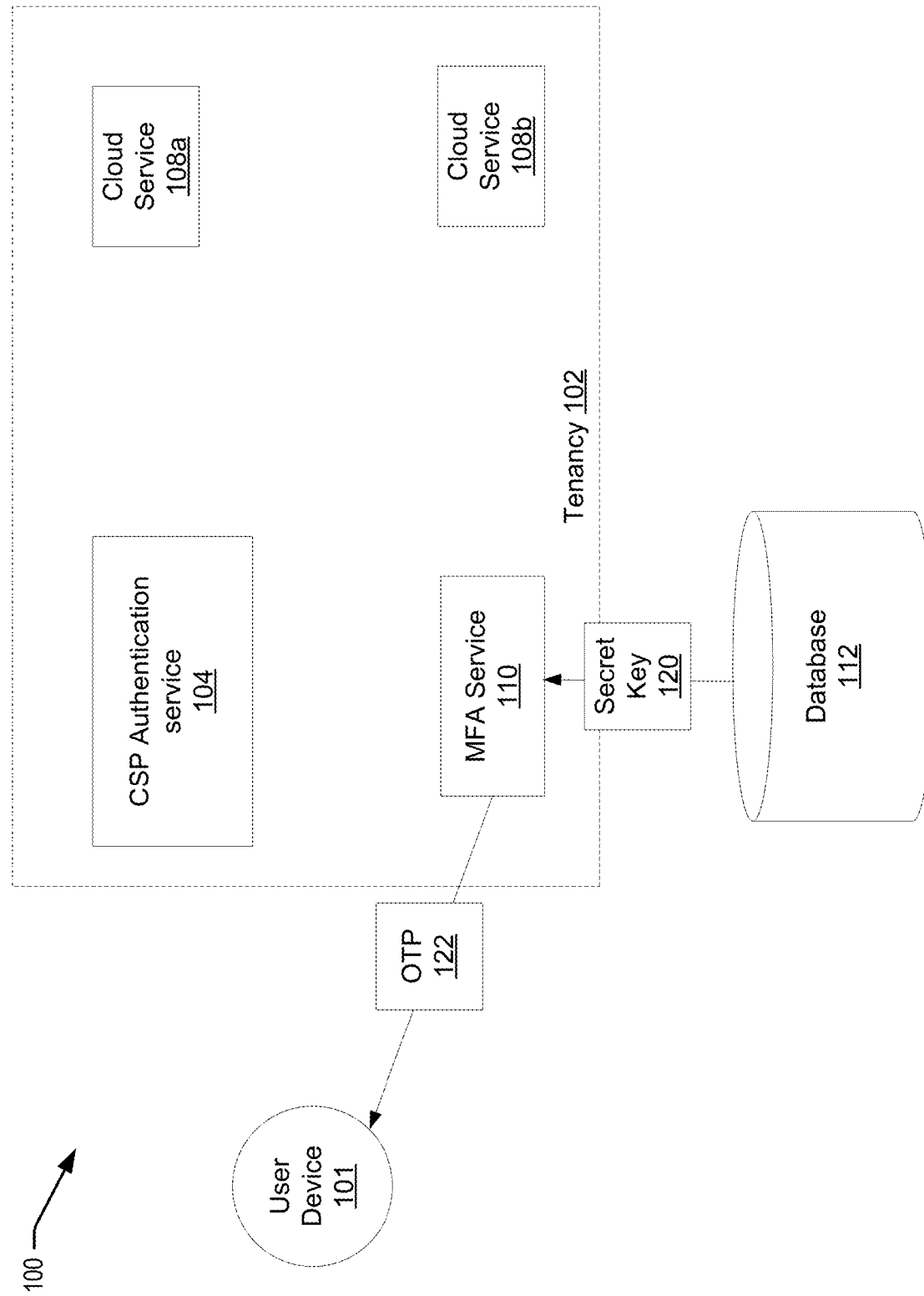

FIG. 1C illustrates a simplified diagram of the system 100 for providing cloud-based multifactor authentication, according to certain embodiments. The MFA service 110 may access a secret key 120 associated with the cloud service 108*b* from the database 112. As described above, the secret key 120 may be generated by the cloud service 108*b* or the MFA service 110, then stored on the database 112. The MFA service 110 may utilize the secret key to generate an OTP 122. The OTP 122 may be a time-based one-time password (TOTP), a temporary access password (TAP), a one-time authorization code (OTAC), or any other suitable OTP. For example, the MFA service 110 may generate the OTP 122 using a specific time corresponding to the request using a clock included in the MFA service 110. The OTP 122 may then be a TOTP and include a window of time for which the OTP 122 is valid. The MFA service 110 may also transmit data to the cloud service 108*b* indicating that an MFA request was made at the specific time. The cloud service 108*b* may then utilize the secret key to generate an expected OTP. Thus, the cloud service 108*b* may include a record of the expected OTP and use the expected OTP to subsequently verify the OTP 122.

The MFA service 110 may then transmit the OTP 122 to the user device 101. The MFA service 110 may transmit the OTP 122 via an API and a browser plugin in a web browser of the user device 101. The OTP 122 may then be displayed by the user device 101 and/or automatically entered in order to verify the user device 101. In other MFA protocols, the secret key may be stored on the user device 101 and/or based on the user device 101 itself (e.g., via an identifier, a mobile number of a cell phone, etc.). Here, the secret key never leaves control of the tenant associated with the tenancy 102, providing more secure OTP generation. Furthermore, because the OTP 122 may not be generated based on the user device 101, a single service account used to access the tenancy 102 via the CSP authentication service 104 may be accessed by multiple users and verified independently.

Figure 1D:
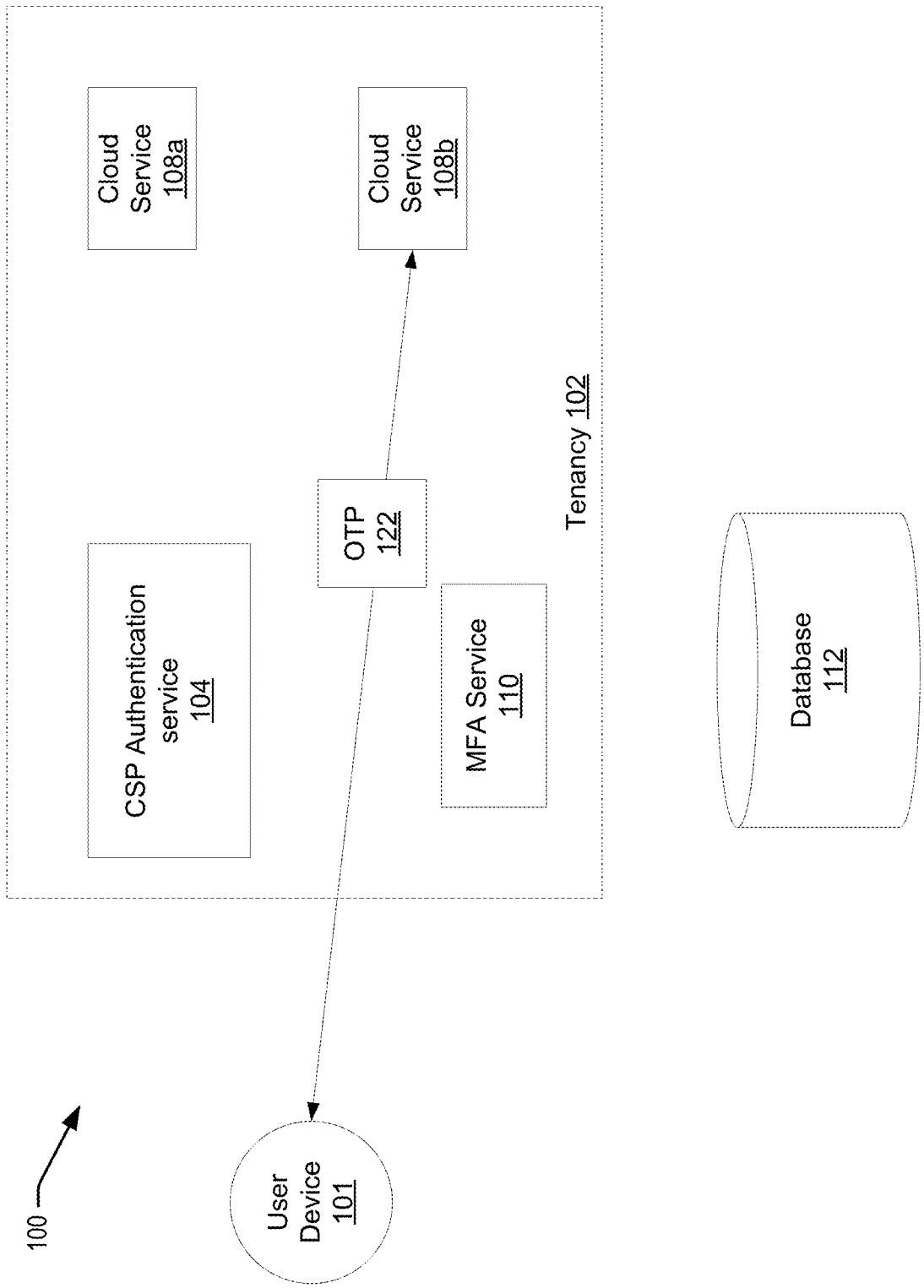

FIG. 1D illustrates a simplified diagram of the system 100 for providing cloud-based multifactor authentication, according to certain embodiments. The user device 101 may transmit the OTP 122 to the cloud service 108*b*. As described above, the cloud service 108*b* may generate the expected OTP (e.g., using a clock included in the tenancy 102, the cloud service 108*b*, or some other clock). The cloud service 108*b* may then verify that the OTP 122 matches the expected OTP. In some embodiments, the cloud service 108*b* may additionally verify that the OTP 122 was received within the appropriate window of time. If the OTP 122 is received after the appropriate window of time, the OTP 122 may be rejected. Then, the cloud service 1 may transmit data to the MFA service 110 indicating that the OTP 122 was rejected. The MFA service 110 may then transmit a notification to the user device and/or send a second OTP to the user device. The process described above may then be repeated. If the OTP 122 is verified by the cloud service 108*b*, access may be granted to the user device 101. The user device 101 may then access the cloud service 108*b*.

Figure 2:
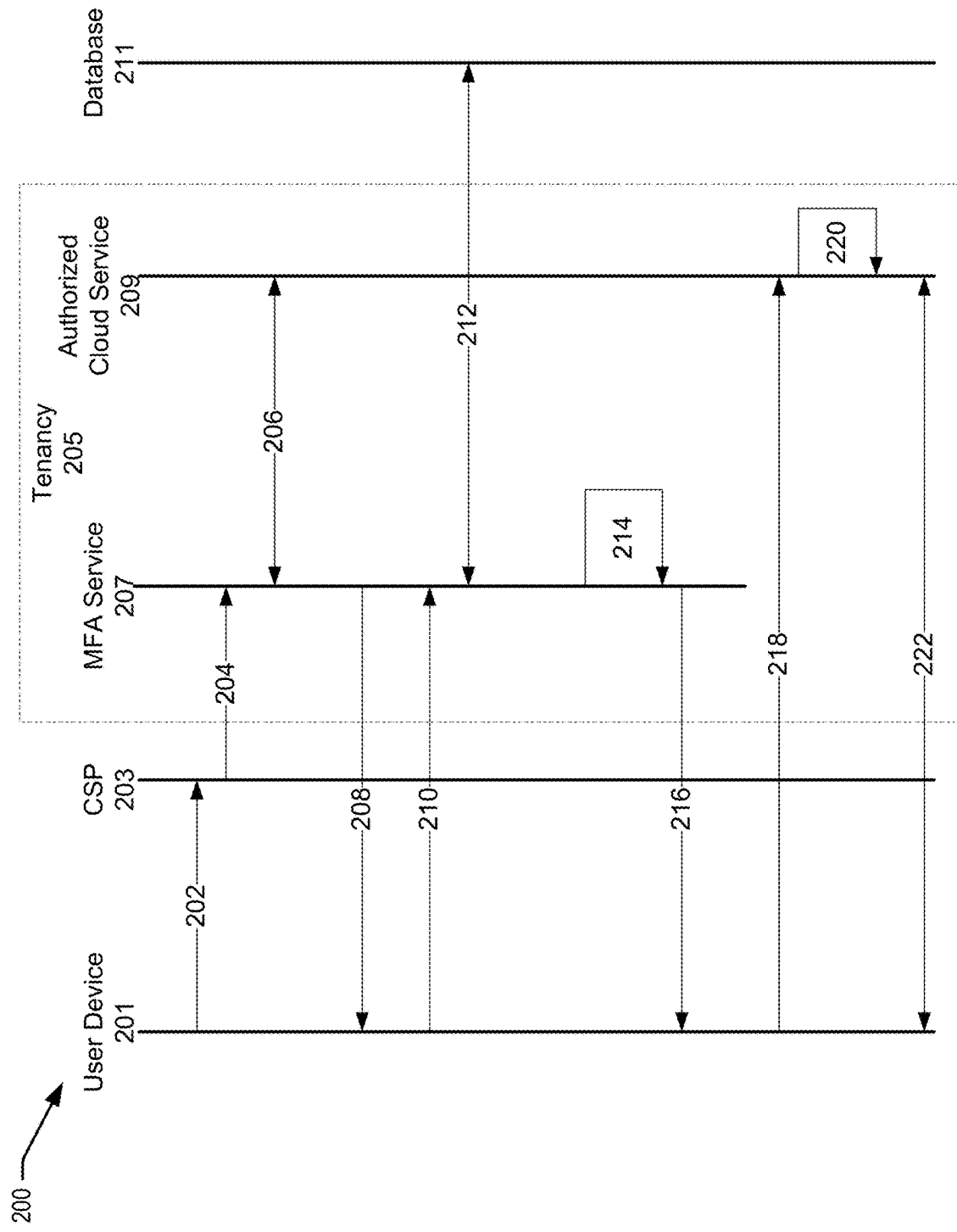
FIG. 2 illustrates a process flow of a process for providing access to a cloud service, according to certain embodiments.

FIG. 2 illustrates a process flow of a process 200 for providing access to a cloud service, according to certain embodiments. The process 200 may be performed in whole or in part by the system 100. Thus, corresponding components shown in FIG. 2 may be understood to be similar to those components described in relation to FIGS. 1A-1D. For example, a user device 201 may be similar to the user device 101, an MFA service 207 may be similar to the MFA service 210, etc.

At 202, the user device 101 may transmit a set of credentials to the CSP 203. The CSP 203 may include a CSP authorization service, similar to the CSP authentication service 104. The credentials may include a username and password and/or other data needed to authenticate to the CSP 203. The credentials may additionally include a secondary authentication scheme, such as an MFA scheme. The secondary authentication may be implemented within the tenancy and/or within a different physical or virtual machine administered by the CSP 203. The CSP 203 may administer a tenancy 205 to a tenant (e.g., a customer of the CSP 203). The tenancy 205 may include one or more physical and/or virtual machines providing cloud computing services to the tenant.

At 204, the CSP 203 may transmit a token to the MFA service 207, instantiated within the tenancy 205. The token may include information such as an identifier associated with the user device 201 (and/or a user thereof). The token may also include information that identifies an access level associated with the user. For example, a first user may be associated with a first access level. The first access level may permit the first user to access all of the resources within the tenancy 205. A second user may be associated with a second access level. The second access level may permit the second user to access only the cloud service. One of ordinary skill in the art would recognize many different possibilities and configurations.

At 206, the MFA service 207 may determine that the user device is authorized to access an authorized cloud service 209. The MFA service 207 may utilize information included in the token to determine that the user device 201 is authorized to access the authorized cloud service 209. In some embodiments, the MFA service 207 may determine an access level of the user device solely based on the information of the token. In other embodiments, the MFA service 207 may verify the access level of the user device 201 with resources of the tenancy 205. For example, the MFA service 207 may access the authorized cloud service 209 and/or some other datastore to determine if the user device 201 should be granted access to the authorized cloud service 209 (e.g., utilizing the identifier included in the token).

At 208, the MFA service 207 may provide a list of authorized cloud services to the user device 201. The MFA service 207 may provide the list to the user device 201 via an API, web connection, or other appropriate means. For example, the user device 201 may access the tenancy 205 via a web browser. The web browser may include a plugin that communicates with the MFA service 207 via an API. Upon verifying the access level of the user device 201, the MFA service 207 may utilize the API to transmit the list to the web browser on the user device 201 via the plugin. The plugin may then cause the list to be displayed within the web browser of the user device 201. The list may be displayed as a list, buttons or tiles of a user interface, or other appropriate display. The list may only include the services and/or resources allowed to be accessed by the user device per the access level. For example, the user device 101 may only be permitted to access the authorize cloud service 209. Then, only the authorized cloud service 209 may be displayed in the web browser of the user device 201.

At 210, the user device 201 may transmit a request to access the authorized cloud service 209 to the MFA service 207. The request may identify the authorized cloud service 209 and/or the user device 201 (or user thereof). In some embodiments, the request may include an MFA request. For example, the authorized cloud service 209 may require multifactor authentication. When the user device 201 requests access to the authorized cloud service 209, the request may automatically include the MFA request for the authorized cloud service 209. In other embodiments, the request may not include the MFA request. In response to receiving the request, the MFA service 207 may determine that the authorized cloud service 209 requires an OTP to access the authorized cloud service 209. The MFA service 207 may then generate the MFA request independently.

In some embodiments, the MFA service 207 may receive the MFA request included in the request and determine further verification is needed. The MFA service 207 may then transmit a challenge (or other such prompt) to the user device 201. The challenge may prompt the user device 201 to provide credentials in order to process the MFA request. The user device 201 may then provide other credentials in response to the challenge. The other credentials may be the credentials provided to the CSP 203, or may be other credentials associated with the MFA service 207 and/or the user device 201 (and/or a user thereof). For example, the other credentials may be an identifier associated with the user device 201 (e.g., a MAC address, an IMEI number, or other such identifier) and/or a username and password. One of ordinary skill in the art would recognize many different possibilities and configurations.

At 212, the MFA service 207 may access a database 211 the MFA service 207 may access a secret key associated with the authorized cloud service 209 from the database 211. As described above, the secret key may be generated by the authorized cloud service 209 or the MFA service 207, then stored on the database 211.

At 214, the MFA service 207 may utilize the secret key to generate an OTP. The OTP may be a time-based one-time password (TOTP), a temporary access password (TAP), a one-time authorization code (OTAC), or any other suitable OTP. For example, the MFA service 207 may generate the OTP using a specific time corresponding to the request using a clock included in the MFA service 207. The OTP may then be a TOTP and include a window of time for which the OTP is valid. The MFA service 207 may also transmit data to the authorized cloud service 209 indicating that an MFA request was made at the specific time. The authorized cloud service 209 may then utilize the secret key to generate an expected OTP. Thus, the authorized cloud service 209 may include a record of the expected OTP and use the expected OTP to subsequently verify the OTP.

At 216, the MFA service 207 may transmit the OTP to the user device 201. The authorized cloud service 209 may generate the expected OTP (e.g., using a clock included in the tenancy 205, the authorized cloud service 209, or some other clock). At 218, the user device 201 may transmit the OTP to the authorized cloud service 209. Then, at 218, the user device 201 may transmit the OTP to the authorized cloud service 209. The authorized cloud service 209 may then verify that the OTP matches the expected OTP. In some embodiments, the authorized cloud service 209 may additionally verify that the OTP was received within the appropriate window of time. If the OTP is received after the appropriate window of time, the OTP may be rejected. Then, the authorized cloud service 209 may transmit data to the MFA service 207 indicating that the OTP was rejected. The MFA service 207 may then transmit a notification to the user device 201 and/or send a second OTP to the user device 201. The process described above may then be repeated. Then at 222, if the OTP is verified by the authorized cloud service 209, access may be granted to the user device 201.

Figure 3:
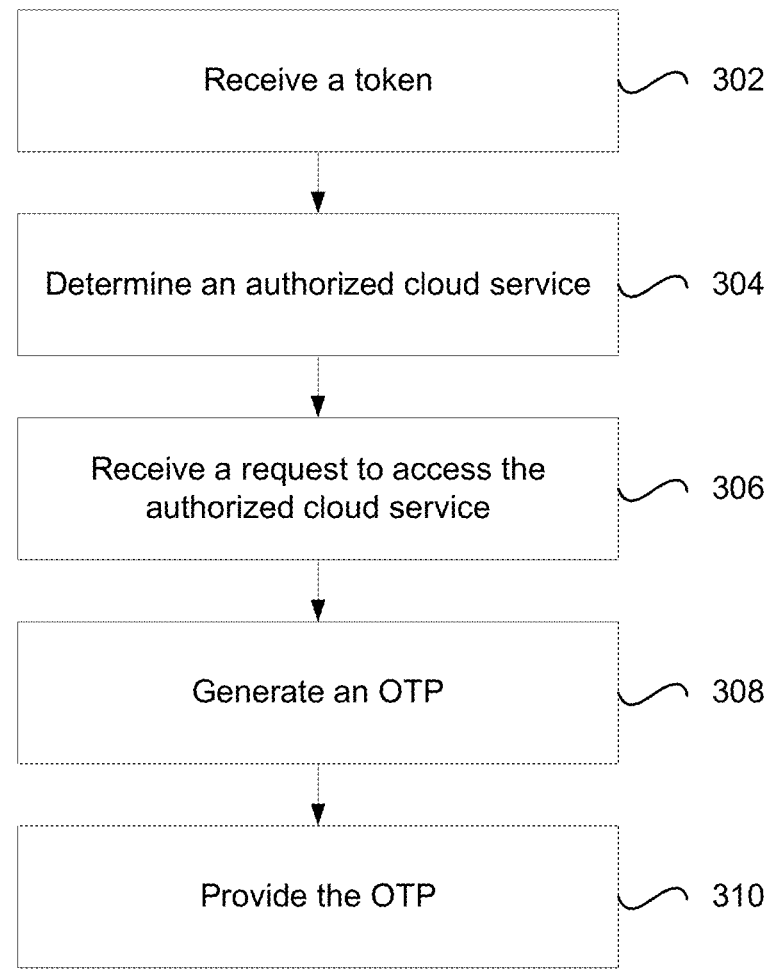
FIG. 3 illustrates a flowchart of a method for providing access to a cloud resource using multifactor authentication, according to certain embodiments.

FIG. 3 illustrates a flowchart of a method 300 for providing access to a cloud resource using multifactor authentication, according to certain embodiments. The method 300 may be performed by some or all of the systems described herein, such as the system 100 in FIGS. 1A-1D. Some of the steps of the method 300 may be performed in a different order than described, and/or combined with other steps. In some embodiments, some steps may be skipped altogether.

At step 302, the method 300 may include receiving, by a multifactor authentication (MFA) service instantiated on a computing system, a token generated by a cloud services provider and associated with a user device. The MFA service may be similar to the MFA service 110 in FIG. 1A. The MFA service may be instantiated within a tenancy of the cloud services provider. specific user or may be associated with no particular user. The tenancy may be one or more physical or virtual machines that are part of a cloud computing system provided by a cloud services provider (CSP). The tenancy may be associated with a client of the CSP.

At step 304, the method 300 may include determining, by the computing system, an authorized cloud service instantiated within the tenancy. The MFA service may utilize information included in the token to determine that the user device is authorized to access the authorized cloud service. In some embodiments, the MFA service may determine an access level of the user device solely based on the information of the token. In other embodiments, the MFA service may verify the access level of the user device with resources of the tenancy. For example, the MFA service may access the authorized cloud service and/or some other datastore to determine if the user device should be granted access to the authorized cloud service (e.g., utilizing an identifier included in the token).

At step 306, the method 300 may include receiving, by the computing system, a request to access the authorized cloud service by the user device. The request comprises an MFA request. In some embodiments, the MFA request may be generated automatically by the user device. In other embodiments, the MFA request may be generated by the MFA service.

In some embodiments, the MFA service may receive the MFA request included in the request and determine further verification is needed. The MFA service may then transmit a challenge (or other such prompt) to the user device. The challenge may prompt the user device 201 to provide credentials in order to process the MFA request. The user device may then provide other credentials in response to the challenge. The other credentials may be credentials provided to a CSP, or may be other credentials associated with the MFA service and/or the user device (and/or a user thereof). For example, the other credentials may be an identifier associated with the user device (e.g., a MAC address, an IMEI number, or other such identifier) and/or a username and password. One of ordinary skill in the art would recognize many different possibilities and configurations.

At 308, the method 300 may include generating, by the MFA service instantiated on the computing system, an OTP. The OTP may be a time-based one-time password (TOTP), a temporary access password (TAP), a one-time authorization code (OTAC), or any other suitable OTP. For example, the MFA service may generate the OTP using a specific time corresponding to the request using a clock included in the MFA service. The OTP may then be a TOTP and include a window of time for which the OTP is valid. The MFA service may also transmit data to the authorized cloud service indicating that an MFA request was made at the specific time. The authorized cloud service may then utilize the secret key to generate an expected OTP. Thus, the authorized cloud service may include a record of the expected OTP and use the expected OTP to subsequently verify the OTP.

In some embodiments, generating the OTP may include accessing, by the MFA service instantiated on the computing system, a database. The database may include a key (e.g., a secret key) associated with the authorized cloud service. The method may also include generating, by the MFA service instantiated on the computing system, the OTP utilizing a hash and the key associated with the authorized cloud service. The database may be a multitenant database and include multiple key associated with multiple tenants and respective cloud resources.

At step 310, the method 300 may include providing, by the MFA service instantiated on the computing system, the OTP to the user device, such that the user device accesses the authorized cloud service. The MFA service may provide the OTP to the user device via a browser plugin and/or an API.

Figure 4:
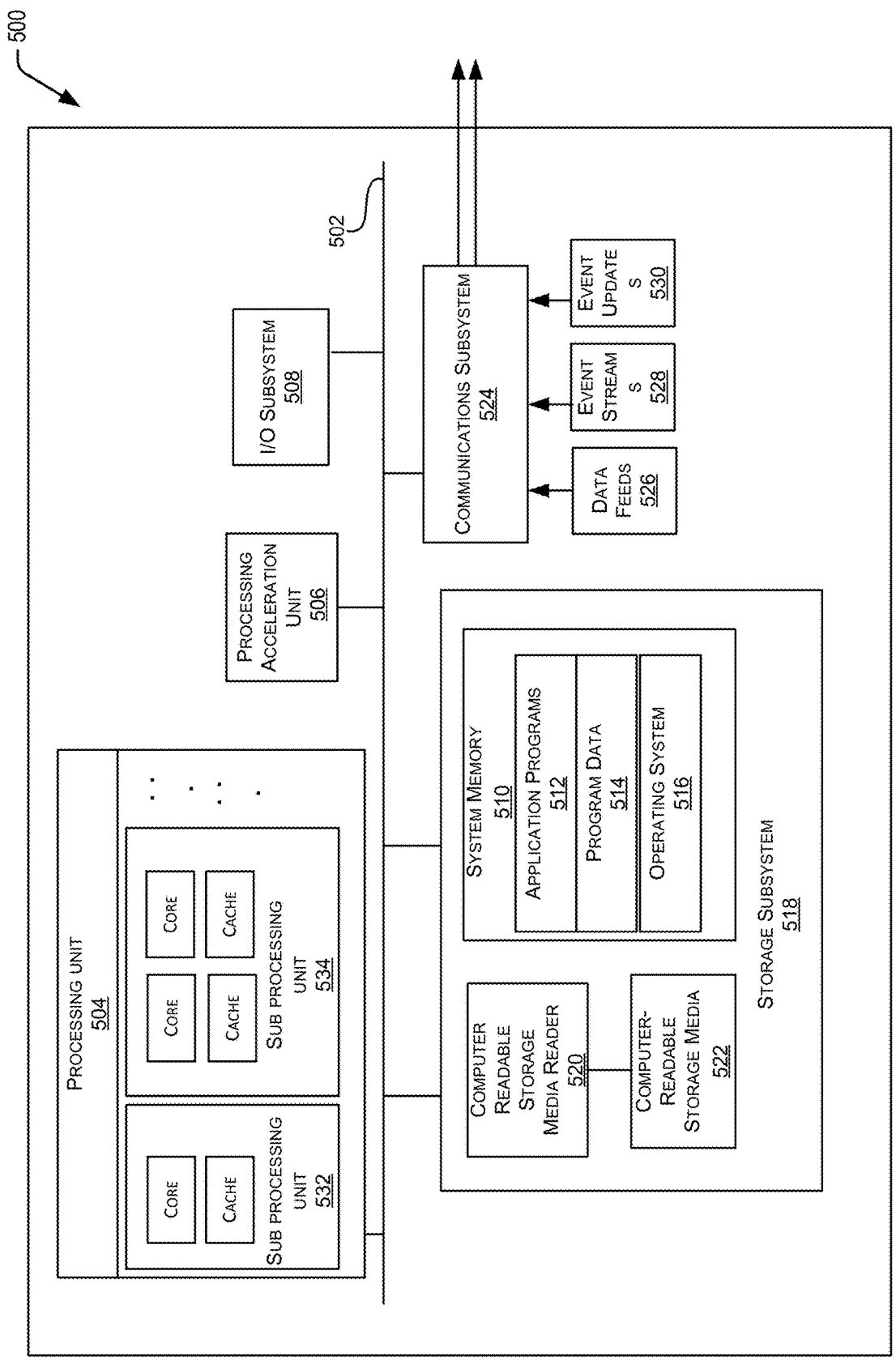
FIG. 4 illustrates an exemplary computer system, in which various embodiments may be implemented.

FIG. 4 illustrates an exemplary computer system 400, in which various embodiments may be implemented. The system 400 may be used to implement any of the computer systems described above. As shown in the figure, computer system 400 includes a processing unit 404 that communicates with a number of peripheral subsystems via a bus subsystem 402. These peripheral subsystems may include a processing acceleration unit 406, an I/O subsystem 408, a storage subsystem 418 and a communications subsystem 424. Storage subsystem 418 includes tangible computer-readable storage media 422 and a system memory 410.

Bus subsystem 402 provides a mechanism for letting the various components and subsystems of computer system 400 communicate with each other as intended. Although bus subsystem 402 is shown schematically as a single bus, alternative embodiments of the bus subsystem may utilize multiple buses. Bus subsystem 402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 404, which can be implemented as one or more integrated circuits (e.g., a conventional microprocessor or microcontroller), controls the operation of computer system 400. One or more processors may be included in processing unit 404. These processors may include single core or multicore processors. In certain embodiments, processing unit 404 may be implemented as one or more independent processing units 432 and/or 434 with single or multicore processors included in each processing unit. In other embodiments, processing unit 404 may also be implemented as a quad-core processing unit formed by integrating two dual-core processors into a single chip.

In various embodiments, processing unit 404 can execute a variety of programs in response to program code and can maintain multiple concurrently executing programs or processes. At any given time, some or all of the program code to be executed can be resident in processor(s) 404 and/or in storage subsystem 418. Through suitable programming, processor(s) 404 can provide various functionalities described above. Computer system 400 may additionally include a processing acceleration unit 406, which can include a digital signal processor (DSP), a special-purpose processor, and/or the like.

I/O subsystem 408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices that enables users to control and interact with an input device through a natural user interface using gestures and spoken commands. Additionally, user interface input devices may include voice recognition sensing devices that enable users to interact with voice recognition systems through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader, 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 400 may comprise a storage subsystem 418 that comprises software elements, shown as being currently located within a system memory 410. System memory 410 may store program instructions that are loadable and executable on processing unit 404, as well as data generated during the execution of these programs.

Depending on the configuration and type of computer system 400, system memory 410 may be volatile (such as random access memory (RAM)) and/or non-volatile (such as read-only memory (ROM), flash memory, etc.). The RAM typically contains data and/or program modules that are immediately accessible to and/or presently being operated and executed by processing unit 404. In some implementations, system memory 410 may include multiple different types of memory, such as static random access memory (SRAM) or dynamic random access memory (DRAM). In some implementations, a basic input/output system (BIOS), containing the basic routines that help to transfer information between elements within computer system 400, such as during start-up, may typically be stored in the ROM. By way of example, and not limitation, system memory 410 also illustrates application programs 412, which may include client applications, Web browsers, mid-tier applications, relational database management systems (RDBMS), etc., program data 414, and an operating system 416.

Storage subsystem 418 may also provide a tangible computer-readable storage medium for storing the basic programming and data constructs that provide the functionality of some embodiments. Software (programs, code modules, instructions) that when executed by a processor provide the functionality described above may be stored in storage subsystem 418. These software modules or instructions may be executed by processing unit 404. Storage subsystem 418 may also provide a repository for storing data used in accordance with some embodiments.

Storage subsystem 400 may also include a computer-readable storage media reader 420 that can further be connected to computer-readable storage media 422. Together and, optionally, in combination with system memory 410, computer-readable storage media 422 may comprehensively represent remote, local, fixed, and/or removable storage devices plus storage media for temporarily and/or more permanently containing, storing, transmitting, and retrieving computer-readable information.

Computer-readable storage media 422 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 400.

By way of example, computer-readable storage media 422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD or other optical media. Computer-readable storage media 422 may include, but is not limited to, flash memory cards, universal serial bus (USB) flash drives, secure digital (SD) cards, DVD disks, digital video tape, and the like. Computer-readable storage media 422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 400.

Communications subsystem 424 provides an interface to other computer systems and networks. Communications subsystem 424 serves as an interface for receiving data from and transmitting data to other systems from computer system 400. For example, communications subsystem 424 may enable computer system 400 to connect to one or more devices via the Internet. In some embodiments communications subsystem 424 can include radio frequency (RF) transceiver components for accessing wireless voice and/or data networks (e.g., using cellular telephone technology, advanced data network technology, such as 3G, 4G, 4G, or EDGE (enhanced data rates for global evolution), WiFi (IEEE 802.4 family standards, or other mobile communication technologies, or any combination thereof), global positioning system (GPS) receiver components, and/or other components. In some embodiments communications subsystem 424 can provide wired network connectivity (e.g., Ethernet) in addition to or instead of a wireless interface.

In some embodiments, communications subsystem 424 may also receive input communication in the form of structured and/or unstructured data feeds 426, event streams 428, event updates 430, and the like on behalf of one or more users who may use computer system 400.

By way of example, communications subsystem 424 may be configured to receive data feeds 426 in real-time from users of social networks and/or other communication services, web feeds such as Rich Site Summary (RSS) feeds, and/or real-time updates from one or more third party information sources.

Additionally, communications subsystem 424 may also be configured to receive data in the form of continuous data streams, which may include event streams 428 of real-time events and/or event updates 430, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 424 may also be configured to output the structured and/or unstructured data feeds 426, event streams 428, event updates 430, and the like to one or more databases that may be in communication with one or more streaming data source computers coupled to computer system 400.

Due to the ever-changing nature of computers and networks, the description of computer system 400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMS, EPROMS, EEPROMs, magnetic or optical cards, flash memory, or other types of machine-readable mediums suitable for storing electronic instructions. Alternatively, the methods may be performed by a combination of hardware and software.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the

What is claimed is:
1. A method, comprising:
receiving, by a multifactor authentication (MFA) service instantiated on a computing system, a token generated by a cloud services provider and associated with a user device, the MFA service instantiated within a tenancy of the cloud services provider;
determining, by the computing system, an authorized cloud service instantiated within the tenancy;
receiving, by the computing system, a request to access the authorized cloud service by the user device, wherein the request comprises a multi-factor authentication request;
generating, by the MFA service instantiated on the computing system, an one-time pad (OTP); and providing, by the MFA service instantiated on the computing system, the OTP to the user device such that the user device accesses the authorized cloud service.

2. The method of claim 1, wherein the request to access the authorized cloud service includes a set of credentials used to validate the user device with the MFA service.

3. The method of claim 1, wherein the OTP comprises a temporary access pass (TAP).

4. The method of claim 1, wherein the OTP comprises a time-based one-time password.

5. The method of claim 1, wherein generating, by the MFA service instantiated on the computing system, the OTP further comprises:
   accessing, by the MFA service instantiated on the computing system, a database comprising a key associated with the authorized cloud service; and
   generating, by the MFA service instantiated on the computing system, the OTP utilizing hash with the key associated with the authorized cloud service.

6. The method of claim 5, wherein the database is a multitenant database comprising a plurality of keys associated with respective cloud services.

7. The method of claim 1, wherein the OTP is provided to the user device via a browser plugin.

8. A system, comprising:
   one or more processors; and
   a non-transitory computer memory, comprising instructions that, when executed by the one or more processors, cause the system to perform operations to:
      receive, by an MFA service instantiated on a computing system, a token generated by a cloud services provider and associated with a user device, the MFA service instantiated within a tenancy of the cloud services provider;
      determine, by the computing system, an authorized cloud service instantiated within the tenancy;
      receive, by the computing system, a request to access the authorized cloud service by the user device, wherein the request comprises a multi-factor authentication request;
      generate, by the MFA service instantiated on the computing system, a one-time pad (OTP); and
      provide, by the MFA service instantiated on the computing system, the OTP to the user device such that the user device accesses the authorized cloud service.

9. The system of claim 8, wherein the request to access the authorized cloud service includes a set of credentials used to validate the user device with the MFA service.

10. The system of claim 8, wherein the OTP comprises a temporary access pass (TAP).

11. The system of claim 8, wherein the OTP comprises a time-based one-time password.

12. The system of claim 8, wherein to generate, by the MFA service instantiated on the computing system, the OTP, the operations further cause the system to:
   access, by the MFA service instantiated on the computing system, a database comprising a key associated with the authorized cloud service; and
   generate, by the MFA service instantiated on the computing system, the OTP utilizing a hash and the key associated with the authorized cloud service.

13. The system of claim 12, wherein the database is a multitenant database comprising a plurality of keys associated with respective cloud services.

14. The system of claim 8, wherein the OTP is provided to the user device via a browser plugin.

15. A non-transitory computer-readable medium comprising instructions that, when executed by one or more processors, cause the one or more processors to perform operations comprising:
   receiving, by a multifactor authentication (MFA) service instantiated on a computing system, a token generated by a cloud services provider and associated with a user device, the MFA service instantiated within a tenancy of the cloud services provider;
   determining, by the computing system, an authorized cloud service instantiated within the tenancy;
   receiving, by the computing system, a request to access the authorized cloud service by the user device, wherein the request comprises a multi-factor authentication request;
   generating, by the MFA service instantiated on the computing system, an one-time pad (OTP); and
   providing, by the MFA service instantiated on the computing system, the OTP to the user device such that the user device accesses the authorized cloud service.

16. The non-transitory computer-readable medium of claim 15, wherein the request to access the authorized cloud service includes a set of credentials used to validate the user device with the MFA service.

17. The non-transitory computer-readable medium of claim 15, wherein the OTP comprises a temporary access pass (TAP).

18. The non-transitory computer-readable medium of claim 15, wherein the OTP comprises a time-based one-time password.

19. The non-transitory computer-readable medium of claim 15, wherein generating, by the MFA service instantiated on the computing system, the OTP further comprises:
   accessing, by the MFA service instantiated on the computing system, a database comprising a key associated with the authorized cloud service; and
   generating, by the MFA service instantiated on the computing system, the OTP utilizing a hash and the key associated with the authorized cloud service.

20. The non-transitory computer-readable medium of claim 19, wherein the database is a multitenant database comprising a plurality of keys associated with respective cloud services.

* * * * *